United States Patent [19]
Knoevenagel et al.

[11] 3,977,952
[45] Aug. 31, 1976

[54] PROCESS FOR DECOMPOSING CARBON-CONTAINING COMPOUNDS

[75] Inventors: Kurt Knoevenagel; Rolf Himmelreich, both of Grunstadt, Germany

[73] Assignee: C. F. Spiess & Sohn, Kleinkarlbach, Germany

[22] Filed: Aug. 12, 1974

[21] Appl. No.: 496,674

[30] Foreign Application Priority Data
Aug. 16, 1973 Germany............................ 2341300
Feb. 23, 1974 Germany............................ 2408788

[52] U.S. Cl...................... 204/157.1 R; 204/158 R; 204/162 R; 250/527
[51] Int. Cl.²........................ B01J 1/10; B01K 1/00
[58] Field of Search............... 204/158 R, 157.1 R, 204/162 R; 250/527

[56] References Cited
UNITED STATES PATENTS
| | | | |
|---|---|---|---|
| 3,649,493 | 3/1972 | Meiners et al. | 204/157.1 R |
| 3,657,087 | 4/1972 | Scott | 204/158 R |
| 3,800,159 | 3/1974 | Lucas | 250/527 |
| 3,819,516 | 6/1974 | Murchison et al. | 210/63 |

OTHER PUBLICATIONS
Stiff, Chemistry & Industry (Jan. 23, 1971) pp. 116–120.

*Primary Examiner*—Howard S. Williams
*Attorney, Agent, or Firm*—Burgess, Dinklage & Sprung

[57] ABSTRACT

Carbon-containing compounds contained in a gas, such as polluted air or an industrial flue gas, or in a liquid, such as an aqueous solution or dispersion, e.g. sewage liquid, contaminated drinking water or waste electroplating baths, are decomposed by being subjected to radiation of a wave length of about 20 to 600 nm in the presence of water and oxygen in excess of the stoichiometric amount required for complete oxidation. A catalytic quantity of hydrogen chloride may also be present. A suitable apparatus is also provided, comprising a chamber containing a source of radiation, a gas inlet and outlet, and means for spraying liquid into said chamber.

12 Claims, 1 Drawing Figure

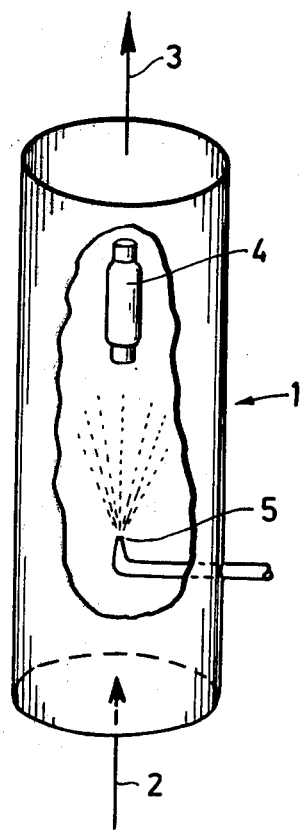

PROCESS FOR DECOMPOSING CARBON-CONTAINING COMPOUNDS

The present invention relates to a process and apparatus for decomposing unwanted carbon-containing compounds such as those present as contaminants in gases and liquids.

In accordance with the invention there is provided a process for the decomposition of one or more carbon-containing compounds comprising exposing to radiation of a wave length of about 20 to 600 nm a mixture of said compounds with water and oxygen in excess.

The process according to the invention is capable of the broadest application. Quite generally, it is suitable for the decomposition of materials usually designated as organic, but also for the decomposition of other carbon-containing compounds such as, for example, cyanides, cyanates, thiocyanates, and their complexes. The carbon-containing compounds to be decomposed according to the invention can be dispersed or homogeneously distributed in gaseous or liquid phase.

The process according to the invention is especially suitable for the removal of the carbon-containing compounds if they are present in only small quantities in the medium to be cleaned, but are especially annoying there because of their toxicity, their unpleasant odor or their color.

In the gaseous phase, the carbon-containing compounds to be decomposed can be distributed homogenously as gases, carbon dioxide, air or hydrogen. In water vapor, air or hydrogen, the gas or gas mixture to be cleaned already contains one reactant necessary for the decomposition.

The carbon-containing compounds to be decomposed can also be present in the gas as a dispersed liquid or solid phase; for example fogs or smokes can be treated, e.g. carbon black. Also fogs or aerosols in which the impurities to be decomposed and the water necessary for the reaction are already present as dispersed liquids or as gases, or smoke with inert inorganic ingredients, can be successfully treated according to the invention. Insofar as the gases, fogs or smokes to be treated do not already contain oxygen and water in the form of water vapor or fine droplets, these reaction components must be added before the irradiation.

It is necessary that water vapor and hydrogen are present in excess in order to obtain a satisfactory rate of decomposition. For oxygen "excess" means an amount in excess of the stoichiometric quantity required for the complete oxidation of the carbon-containing substances. The water vapor must be present at least in catalytic quantities; preferably, the treatment takes place in damp or aqueous systems.

Water vapor and oxygen do not have to be present originally in a contaminated gas to be purified. Oxygen can be added in pure form or desirably as atmospheric oxygen, i.e. air, before the treatment according to the invention. Water vapor can be added to the gas through spraying or atomizing of water or as such. In certain cases, sufficient moistening is achieved if the gases are sucked or pumped through a damp filter. Preferably, the gas mixture to be treated is saturated with water vapor.

The process according to the invention is especially suitable for the purification of foul-smelling gases or gases containing small quantities of gaseous organic environmental pollutants. an exact knowledge of their chemistry is not necessary since all organic compounds can be decomposed according to the process of the invention. Thus, while not fully identifiable, there can reliably and quickly be decomposed in accordance with the invention the decomposition products of albuminous substances, which lead to strong objectionable odors upon storage, e.g. raw materials for and residues of tanneries, hide- and carcass-treating plants.

The same applies to air which still contains small quantities of foul-smelling, especially unsaturated, aldehydes, e.g. acrolein, mercaptans, isonitriles or phenols. Especially advantageously, according to the process of the invention, the stale air of a closed room can be freed of cigarette smoke, small dust particles and the like, and sterilized by pumping the air through a humidifier under irradiation. In the same manner, one can also purify presumable fresh air which for some reason still contains organic substances or germs, before it is supplied to its final destination. In such processes it is of special advantage that not only are germs killed, but their organic substance is decomposed so that the latter can no longer serve as a culture medium for those germs which were not destroyed.

In the simplest case, a commercially available humidifier can be used to conduct the process according to the invention, to which a strong light source is attached for irradiation of the humidified air.

Also air conditioning plants, in which the air is normally filtered and brought to predetermined temperature and relative humidity, can be used for conducting the process according to the invention if they are additionally equipped with a source of radiation so that the moistened air in the air conditioner is additionally irradiated with light of a suitable wave length.

Also industrial waste or flue gases which still contain environment-polluting carbon-containing compounds can be purified according to the process of the invention, especially since, as a rule, they already contain the reactants, oxygen and water vapor. The temperature in the gas phase is not critical and can amount to several hundred degrees Centigrade, especially since elevated temperatures also increase the speed of the decomposition.

Liquid phase processing is also feasible, whether in the form of aqueous solutions, emulsions or suspensions. Here, also, the process according to the invention is especially effective even if polluting impurities are present only in very small quantity, but are especially annoying because of their toxicity or their taste, as is the case with cyanide- or oil-containing ground water. The process according to the invention also is of great importance for the additional purification of liquid waste, especially such as has already been extensively prepurified by the usual means. Waste is employed herein in its broadest sense. For example it includes spent impregnating emulsions in the textile industry, oil-containing waters such as spent cutting oils and drilling oils, acid sludges, sewage from purification-, synthetic fiber, cotton, glue-, soap-, starch-, rubber- and sugar-making plants, from dye works, wool laundries, galvanizing plants, tanneries, slaughter houses, tallow melting plants, and also sewage sludges which contain impurities in higher concentrations. Just as when decomposing the carbon-containing compounds in the gaseous phase, when decomposing them in the liquid phase their chemical nature is not important, since all the organic substances are decomposed.

Examples of organic compounds decomposable according to the invention are: polyamides such as wool, casein, natural silk, nylon-6, nylon-66, phenol resins such as phenol-formaldehyde synthetic resins in the form of resol, resitol, resit and novolak. Silicone such as methyl silicone (silicone oil), methyl phenyl silicone (silicone resin), as well as methyl polysiloxanes and boron-siloxane-elastomers (silicone rubber), polyethylene, polypropylene, polyvinylchloride, polytetrafluoroethylene, polymethacrylic acid ester such as polymethacrylic acid methyl ester, -ethyl ester, -propyl ester, etc.

Monomeric organic compounds which can be decomposed successfully are, for example: esters such as ethyl acetate and ethyl levulinate, alcohols such as methanol and ethanol, aromatic compounds such as benzene, toluene, nitrobenzene and fluorenes, insecticides such as DDT and hexacholorocyclohexane, aldehydes such as formaldehyde, nitriles such as acetonitrile, and isonitriles such as methyl isocyanide.

A special advantage of the process according to the invention resides in the fact that normally stable cyano complexes can also be destroyed and rendered harmless while at the same time the metal contained as the center atom in the complex is precipitated, in elementary form if it is a noble metal and as oxide or hydroxide if it is a base metal. Such complexes include, for example the hexacyanoferrate complex of Berlin blue. This can be utilized to substantial advantage in cyanide leaching plants for the recovery of gold and silver. Gold and silver separate out in flaky elementary form and can be filtered out.

The applicability of the process according to the invention is substantially independent of the physical state of the substances to be decomposed, i.e. they can be present in solution, emulsified or suspended. The degree of dispersion can be of importance for the speed of the decomposing reaction; for finer dispersion of the waste material the use of one of the usual detergents is recommended, such as, for example, a wetting agent or an emulsifier. However, it must be borne in mind that the detergent, insofar as it is of an organic nature, is also subject to the decomposition reaction and must therefore be replaced in subsequent cycles. To obtain a good dispersion, inert inorganic substances can also be used such as, for example, pulverized talc, silicic acid, attaclay, and the like, which remain after the decomposition of the waste materials and thus can be used again.

The liquid phase decomposition according to the invention can also be carried out over a very broad temperature range; since it proceeds more rapidly at higher temperatures, however, it is preferred to work at elevated temperature. A temperature range between about 20° and 100°C, preferably between about 40° and 90°C, has proven favorable. In individual cases, the reaction can also be carried out under pressure with the use of water vapor, so that still higher temperatures are possible.

In order fully to utilize the intensity of the irradiation, it is recommended to expose the aqueous media to be treated in the form of thin layers or fine droplets. For the removal of environmental pollutants from contaminated ground- and drinking water, in many cases the oxygen dissolved in water is already sufficient for the decomposition according to the process of the invention during the irradiation. Otherwise, the required oxygen can be added in pure form or preferably as atmospheric oxygen, i.e. air.

For the radiation by light of a wave length of about 20 to 600 nm there can be used a radiating tube such as a mercury lamp, or in the simplest case even sunlight, whose intensity can be increased for the reaction to be conducted, through concave mirrors or other reflectors. Additionally, it has been found that the decomposition reaction according to the process of the invention is improved if catalytic quantities of a chlorine compound, especially hydrogen chloride, are added to the mixture to be treated. For the treatment in aqueous phase, this function is also fulfilled by chlorine ions. This catalytic effect can be detected especially clearly in the decomposition of carbon-containing compounds which are rich in hydrogen. For these reasons it is desirable to add a small amount of hydrochloric acid to the reaction mixture from the outset, if hydrochloric acid is not formed during the reaction itself as it is in the decomposition of chlorinated hydrocarbons. It is desirable to keep the concentration of the hydrochloric acid at a predetermined level during the reaction through known techniques. The desired pH-value is dependent on the characteristic of the substance and must be determined empirically in individual cases. If, according to the process of the invention, the carbon-containing compounds are exposed to the effect of oxygen or oxygen-containing gases by radiation with ultraviolet light, the compounds dispersed therein are subjected to photo-oxidation. The carbon content is converted into carbon dioxide which escapes after saturation of the aqueous medium. The nitrogen is set free as ammonia- or nitrate nitrogen, depending on its initial combined form. For example, the nitrogen of the so-called pseudo-halogens is converted into ammonia. Sulfur-containing organic compounds such as foul-smelling mercaptans and thioethers, as a rule, evolve sulfur dioxide.

The general applicability of the process according to the invention for the decomposition of all organic substances in water and sewage is proven by the fact that elementary carbon is also completely converted into carbon dioxide. This reaction occurs as well with powdered charcoal as with diamond dust.

The invention will be further described with reference to the drawing wherein the FIGURE shows a suitable device for conducting the process.

Referring now more particularly to the drawing, there is shown a hollow cylindrical reaction chamber 1 which can be coated with a reflecting layer. A gaseous mixture which already contains oxygen and water vapor is introduced through the feed line 2, passes the light source 4 and leaves the reaction chamber 1 through the outlet 3. If the gas mixtures to be reacted to not contain enough water, water can be sprayed in as a fine jet at 5. With the same apparatus aqueous media can also be reacted according to the process of the invention. The residual water or aqueous medium can be collected below the inlet 2 and optionally can be recycled to the spray device 5.

The process according to the invention will be explained in further detail with the help of the following examples. It is unimportant whether the atmospheric oxygen, as in the examples, is led through the reaction mixture or whether the reaction mixture is brought into close contact with the atmospheric oxygen over a larger surface. In practice, it is not necessary that the oxygen used is free of carbon dioxide. However, in the examples a carbon dioxide-free air current was used in order to prove the decomposition qualitatively and quantitatively. Since several different reactions take place side-by-side and successively upon the decomposition of the various organic compounds, a direct comparison of the decomposition speeds of the individual substances together, based on a recitation of the half-life period, is not meaningful. Therefore, in the tabular compilation of the results for the various substances, those values for the period were chosen which, from the decomposition curves obtained for the individual substances, correspond to a decomposition of 25%, 50% and 75%.

EXAMPLE 1

Through a solution of 150 mg of ethanol in 900 ml of water, an air current free of carbon dioxide was conducted with vigorous stirring and under simultaneous radiation with ultraviolet light from a mercury high pressure immersion lamp. The temperature of the reaction mixture during the test amounted to 90° to 95°C. The carbon dioxide resulting from the reaction was conducted by the air current through a reflux condenser into a receiver containing barite liquor, collected there and determined from time to time. The decomposition rates can be found in Table I.

EXAMPLE 2

The test described in Example 1 was repeated, except that instead of the 900 ml of water there was used a solution of 34.5 ml of 0.1 N HCl in 865.5 ml of water. The measured rates of decomposition are presented in Table I.

By the same process described above and/or in Example 1, the materials set forth at Table I under Nos. 3 to 19 were treated and their decomposition rates determined. For the decomposition of suspended particles vigorous stirring was employed.

EXAMPLE 3

An air current free of carbon dioxide was conducted through an aqueous suspension of 450 mg of a mixture of equal parts of KEPONE and silicic acid (DS 320 Degussa) with vigorous stirring and with simultaneous radiation with a mercury high pressure immersion lamp. In one test the temperature was 18°C and in an additional test 90° to 95°C. The carbon dioxide formed during the reaction was conducted by the air current through a reflux condenser into a receiver containing barite liquor, there collected and determined. At 18°C it took 50.7 hours until 100 mg of carbon dioxide were formed, but only 11.3 hours at 90° to 95°C. The decomposition rates obtained can be found in Table II together with those for additional insecticides tested.

EXAMPLE 4

This test was conducted as described in Example 3, except that the irradiation occurred with sunlight and the temperature during the test amounted to between 20° and 25°C. Although the Duran glass of the bulb surely absorbed a considerable amount of the active radiation, still no decomposition took place. After a period of 15 hours only 2.75 mg carbon dioxide were obtained, which corresponds to a decomposition of 1.27%.

EXAMPLE 5

The test of Example 3 was repeated; however, instead of Kepones Kelevan was chosen, a compound which was obtained through reacting Kepones with ethyl levulinate. Here also the reaction was conducted at different temperatures. For the formation of 100 mg of carbon dioxide, the required reaction time at 18°C was 109.2 hours, at 40°C it was 68.5 hours and at 90° to 95°C it was 27.5 hours.

EXAMPLE 6

In each case, one of the substances set forth in Table III was dispered as finely as possible in 865.5 ml of water and to this mixture were added 34.5 ml of 0.1 N HCl. With vigorous stirring and under simultaneous radiation with a mercury high pressure immersion lamp, a carbon dioxide-free air current was then conducted through the mixture. During the test, the temperature amounted to 90° to 95°C. The carbon dioxide formed during the reaction was conducted by the air current through a reflux condenser into a receiver with barite lye solution, there collected and measured. In Table III there are set forth the times required for the decomposition of 25%, 50% and 75% of the material.

EXAMPLE 7

In order to show that the organic substances were completely decomposed under the conditions according to the invention, the decomposition rates obtained with polyethylene are compiled in the following table, the polyethylene having been treated according to the process described in Example 6. From 140 mg of polyethylene, 440.0 mg of carbon dioxide are theoretically obtainable.

| Time Hours | mg $CO_2$ total | % $CO_2$ of the maximum quantity theoretically obtainable |
|---|---|---|
| 7 | 16.94 | 3.85 |
| 24 | 42.46 | 9.65 |
| 31.5 | 62.99 | 14.3 |
| 55.2 | 100 | 22.73 |
| 96 | 181.06 | 41.15 |
| 120 | 221.32 | 50.3 |
| 143 | 273.24 | 62.1 |
| 167 | 324.06 | 73.65 |
| 191 | 271.58 | 84.45 |
| 243 | 440.0 | 100.0 |

EXAMPLE 8

Through a 20 liter round-bottom glass flask which contained an ultraviolet lamp in a quartz tube, air and water were pumped in separate circulation. The water circulation was conducted by dispersing the water through a spray nozzle. The water collecting at the bottom of the flask was again conducted to the spraying nozzle with the help of a pump. Altogether, 1 liter of water was in circulation. In the same manner, an air current was kept circulating through the flask via a pump. Various organic substances were added to the air current and/or to the stream of water and then the time was measured which was required for the complete decomposition of the tested substances. The examination was conducted according to smell or by sensitive analytical methods. Six different substances were tested. The results are compiled in Table IV.

The above described test was repeated with ethyl bromide, allyl alcohol and acrolein. The air current was conducted through a spare flask with specified quantities of the aforementioned substances and the decomposition of these substances was measured.

The results are compiled in Table V.

Table I

| No. | Substance | Weight (mg) | ml 0.1 N HCl catalyst | Time in Hours to Formation of $CO_2$ in indicated % of Theory | | |
|---|---|---|---|---|---|---|
| | | | | 25% | 50% | 75% |
| 1. | Ethanol | 150 | 0 | 62.3 | 132.9 | 219.2 |
| 2. | Ethanol | 150 | 34.5 | 7.6 | 31.2 | 57.0 |
| 3. | Ethyl Levulinate | 144 | 0 | 4.0 | 15.0 | 125.0 |
| 4. | Ethyl Levulinate | 66 | 45.8 | 2.0 | 4.6 | 13.5 |
| 5. | Urea | 304.9 | 0 | 8.7 | 17.8 | 28.6 |
| 6. | Urea | 301.8 | 69.0 | 3.5 | 9.9 | 17.8 |
| 7. | Casein | 150 | 34.5 | 1.0 | 1.9 | 6.1 |
| 8. | Maizena** | 162 | 34.5 | 1.5 | 6.0 | 23.8 |
| 9. | Gelatin | 150 | 34.5 | 3.8 | 8.4 | 17.4 |
| 10. | Sodium cyanide | 98 | 0 | 10.7 | 21.5 | 38.3 |
| 11. | Potassium rhodanide* | 98 | 0 | 8.3 | 16.5 | 26.7 |
| 12. | Berlin blue | 300 | 0 | 49.8 | 228.7 | calc. 343.0 |
| 13. | Silver cyanide | 420.8 | 0 | 13.4 | 22.7 | 38.4 |
| 14. | Hydroquinone | 110 | 69.0 | 6.27 | 17.24 | 32.04 |
| 15. | Nitrobenzene | 126.8 | 69.0 | 13.42 | 59.01 | 89.1 |
| 16. | Fluorene | 83.1 | 69.0 | 21.7 | 82.2 | 180.1 |
| 17. | Activated carbon | 120 | 34.5 | 135.5 | 282.3 | 423.0 |
| 18. | Diamond dust (6-10 micron) | 24.0 | 69.0 | 19.6 | 69.8 | 121.2 |
| 19. | Diamond dust (6-10 micron) | 24.0 | 0 | 16.4 | 42.8 | 71.3 |

*The sulfur was thereby oxidized into sulfite and driven over into the receiver as $SO_2$.
**defatted pure maize starch Table II

| No. | Substance | Time in Hours to Formation of $CO_2$ in indicated % of Theory | | |
|---|---|---|---|---|
| | | 25% | 50% | 75% |
| 1 | Kepone¹ | 2.0 | 3.6 | 6.2 |
| 2 | Dieldrin | 2.85 | 4.8 | 12.5 |
| 3 | Dieldrin | 4.7 | 11.5 | 18.4* |
| 4 | Kelevan Acid | 2.55 | 5.0 | 24.5 |
| 5 | Endosulfane | 5.0 | 9.5 | 31.0 |
| 6 | Endosulfane | 4.5 | 18.3 | 24.6* |
| 7 | Kelevan'' | 5.0 | 15.0 | 33.0 |
| 8 | Kelevan | 1.2 | 9.6 | 9.0* |
| 9 | γ-Hexachlorocyclohexane | 3.0 | 17.4 | 45.8 |
| 10 | α-Hexachlorocyclohexane | 4.2 | 24.2 | 40.0 |
| 11 | Endrin | 15.0 | 41.0 | 172.0 |
| 12 | Endrin | 9.4 | 18.9 | 66.8* |
| 13 | Aldrin | 12.0 | 56.0 | calc. 764 |
| 14 | Aldrin | 10.75 | 22.1 | 42.6* |
| 15 | DDT | 24.0 | 99.0 | calc. 198 |
| 16 | DDT | 12.7 | 42.1 | 191.0* |

*catalyzed in each case with 69 ml 0.1 N HCl
¹ 1.1a.3.3a.4.5.5.5a.5b.6 Decachlor-octahydro-1H-1.3.4.-metheno-cyclobuta[cd]pentalen-2-on
'' [5-1.1a.3.3a.4.5.5.5a.5b.6 Decachlor octahydro-2-hydroxy-1H 1.3.4-metheno-cyclobuta[cd]pental-en-(2)-yl]-lävulinsäureäthylester Table III

| No. | Substance | Weight(mg) | Time in Hours to Formation of $CO_2$ in indicated % of Theory | | |
|---|---|---|---|---|---|
| | | | 25% | 50% | 75% |
| 1 | Silicone* | 1.245 g | 4.4 | 16.5 | 54.0 |
| 2 | Nylon | 150 | 7.2 | 18.2 | 29.6 |
| 3 | Bakelite | 150 | 5.6 | 20.7 | 42.5 |
| 4 | Teflon | 100 | 10.0 | 30.0 | 59.5 |
| 5 | Polyvinylchloride | 100 | 13.0 | 33.0 | 57.0 |
| 6 | Paraffin (solid) | 150 | 24.0 | 47.0 | 130.0 |
| 7 | Polyethylene | 140 | 39.0 | 85.0 | 126.0 |
| 8 | Plexiglass | 100 | 6.8 | 13.6 | 20.4 |

*1.245 g Silicone-Sand-mixture = 150 mg Silicone

Table IV

| No. | Substance | Weight(mg) | Hours to Complete Decomposition | Indicator — Reagent |
|---|---|---|---|---|
| 1 | Pyridine | 200 | 97.5 | Aniline with Brom-Cyanide |
| 2 | Propionaldehyde | 20 | 32 | Schiffs-Reagent |
| 3 | Phenol | 10 | 23.7 | $KMnO_4$ Solution |
| 4 | Aniline | 204.4 | 23.0 | $Ca(OCl)_2$ |
| 5 | Acrylonitrile | 159.4 | 125.5 | $KMnO_4$ — solution |
| 6 | Methylvinylketone | 100.0 | 26.0 | $KMnO_4$ — solution |

Table V

| No. | Substance | Weight(mg) | Decomposition mg | Hours | Proof of decrease by |
|---|---|---|---|---|---|
| 7 | Ethylbromide | 143.0 | 38.13 | 6 | Silver analysis |
| 8 | Ethylbromide | 715.0 | 147.0 | 6 | Silver analysis |
| 9 | Allylalcohol | 170.4 | 17.69 | 7 | Bromine analysis |
| 10 | Allylalcohol | 170.4 | 24.7 | 23 | '' |
| 11 | Acrolein | 212.0 | 182.95 | 6 | '' |

It will be appreciated that the instant specification and examples are set forth by way of illustration and not limitation, and that various modifications and changes may be made without departing from the spirit and scope of the present invention.

What is claimed is:

1. A process for the decomposition of a carbon-containing compound substantially completely to carbon dioxide which comprises exposing to radiation of a wave length of about 20 to 600 nm a mixture consisting essentially of said compound with water containing a catalytic amount of hydrogen chloride while supplying oxygen in excess of the stoichiometric amount required for complete oxidation of said compound.

2. The process of claim 1 wherein the irradiated product is treated to remove therefrom hydrogen chloride contained therein.

3. The process of claim 1 wherein the aqueous solution comprises waste liquid sewage.

4. The process of claim 1 wherein the aqueous solution comprises a waste solution containing at least one of silver cyanide and gold cyanide, at least one of silver and gold being precipitated in the course of the irradiation.

5. The process of claim 1 wherein the aqueous solution comprises contaminated ground- or drinking water.

6. The process of claim 1 wherein the carbon-containing compound is present in polluted air which is subjected to the irradiation.

7. The process of claim 1 wherein the carbon-containing compound is present in an industrial flue gas which is subjected to the irradiation.

8. The process of claim 1 wherein the gas subjected to irradiation is saturated with water vapor.

9. The process of claim 1, wherein the mixture comprises an aqueous emulsion or suspension of said compound.

10. The process of claim 9, wherein said compound comprises a polymeric material.

11. The process of claim 9, wherein said compound comprises a chlorinated hydrocarbon.

12. The process of claim 9, wherein said compound comprises a hydrocarbon.

* * * * *